Dec. 16, 1969 KIYOJI TAKEMI ET AL 3,484,110

FOUR-TRACK AND EIGHT-TRACK CARTRIDGE TAPE RECORDER
WITH AUTOMATIC HEAD INDEXING

Filed Oct. 24, 1967 8 Sheets-Sheet 1

INVENTORS
KIYOJI TAKEMI AND
TOKUJI NEGISHI
BY
Linton and Linton
ATTORNEYS

INVENTORS
KIYOJI TAKEMI AND
TOKUJI NEGISHI
By Linton and Linton
ATTORNEYS

INVENTORS
KIYOJI TAKEMI AND
TOKUJI NEGISHI
By Linton and Linton
ATTORNEYS

Dec. 16, 1969 KIYOJI TAKEMI ET AL 3,484,110

FOUR-TRACK AND EIGHT-TRACK CARTRIDGE TAPE RECORDER WITH AUTOMATIC HEAD INDEXING

Filed Oct. 24, 1967 8 Sheets-Sheet 4

INVENTORS
KIYOJI TAKEMI AND
TOKUJI NEGISHI
BY
Linton and Linton
ATTORNEYS

INVENTORS
KIYOJI TAKEMI AND
TOKUJI NEGISHI
BY
Linton and Linton
ATTORNEYS

INVENTORS
KIYOJI TAKEMI AND
TOKUJI NEGISHI
BY
Linton and Linton
ATTORNEYS

INVENTORS
KIYOJI TAKEMI AND
TOKUJI NEGISHI
BY
Linton and Linton
ATTORNEYS

INVENTORS
KIYOJI TAKEMI AND
TOKUJI NEGISHI
BY
Linton and Linton
ATTORNEYS

United States Patent Office 3,484,110

Patented Dec. 16, 1969

3,484,110

FOUR-TRACK AND EIGHT-TRACK CARTRIDGE TAPE RECORDER WITH AUTOMATIC HEAD INDEXING

Kiyoji Takemi, Tokyo, and Tokuji Negishi, Kawaguchi-shi, Japan, assignors to Teikoku Dempa Co., Ltd., Tokyo, Japan Filed Oct. 24, 1967, Ser. No. 677,522
Claims priority, application Japan, Oct. 24, 1966, 41/98,182, 41/98,183 (both utility models)
Int. Cl. G11b 5/78
U.S. Cl. 274—4 3 Claims

ABSTRACT OF THE DISCLOSURE

The present tape recorder is for use with either a four-track tape or an eight-track tape cartridge with the insertion of either cartridge automatically setting the recorder elements for use therewith.

The present invention pertains to a tape recorder, particularly a unique tape recorder adapted to be equipped with a selected cartridge which can be used for either four-track tape or eight-track tape making it possible to operate a smooth sound recording and reproducing system.

The tape used for sound recording and reproducing and the cartridge holding this tape as manufactured are of two kinds: the one for four-track use and the other for eight-track. Heretofore, usually in order to cope with the problem of variation of tapes of different numbers of tracks and cartridges receiving tapes, it has been necessary to make two separate different tape recorders. That is to say, it has been necessary to make one tape recorder for four-track use and another tape recorder for eight-track use, and each cartridge should be used with a tape recorder specifically adapted to it. Though a cartridge for four-track use and the one for eight-track use are almost the same as to their external sizes and forms, the one contains a pinch-roller pressed by a capstan, whereas the other does not. Moreover, the distance between adjacent individual tracks being naturally different, it is necessary to use different adjustments. However, if two different tape recorders are made, not only the expense is doubled, but also their maintenance is very troublesome. Especially for automobile use, as it is there installed in a small restricted space, it is impossible to use different type tapes or cartridges, unless they are transferred to another type of machine. This is a drawback of the conventional apparatus as heretofore produced.

The present invention is an improvement over the former defective tape recorder. This means that the fundamental object of this present invention consists in a free use of the above mentioned four-track and eight-track cartridges on unique types of tape recorder. For this purpose, in this present invention, a tumbling pinch-roller is provided on the tape recorder side so that by inserting this kind of tumbler system, the pinch-roller in the cartridge can be switched into operation by means of cams which are fitted in plural numbers thereto. The said cams can be also switched according to the kind of cartridge. In this way, the tumbling of the pinch-roller can be made adjustable and by switching the head position of the cams, the usefullness compared to the existing tape recorder is doubled or more. The cost of making these tape recorders can thereby be reduced by one-half and a troublesome stock and exchange of the parts can be eliminated, thus enabling a free use of any suitable type of tape recorder. It is evident that this is a desirable and useful kind of tape recorder to be installed in an automobile.

Another important object of this present invention consists in making possible very easy exchange of a tape recorder in accordance with the difference in kind of cartridges. For this purpose, in this present invention the change of tape recorder for the particular cartridge can be performed by utilizing the above-mentioned type of construction of the cartridge. Consequently, in case when any given cartridge is in use, by simply inserting the cartridge, the desired action of the pinch-roller or the head can be obtained. In this present invention, the user has just to insert the cartridge inside the machine. He substantially has not need of changing the tape recorder itself, the operation by the user can be made easily as is the case with a special type of cartridge for each of the former types of four-track and eight-track ones.

One more object of this present invention consists in its easy and exact operation of tumbling and switching and the equipment can be put on and off smoothly. To the pinch-roller there is applied a certain force by the action of a spring. To raise up this pinch-roller which is mounted strongly enough by means of a spring, it is necessary to provide, as a matter of fact, not only the lifting power of a certain strength but also a strong structure of its operating part as well. On the contrary, when the pinch-roller is not lifted, the operating part should be preferably completely released. In case when there should be a combination, there is difficulty in putting on and off the cartridge.

In this present invention, three members are pivoted to fitting mountings under suitable spring action so that the above relations can be effectively changed over in order to form a complete and uniform combination as well as a complete and separate relation. Thus the lifting of the pinch-roller can be performed exactly and at the same time, and when no lifting of the pinch-roller is being performed, a smooth put-on and off of the cartridge can be assured.

Another purpose of this present invention is to provide a tape recorder enabling to perform exactly any kind of sound recording and reproducing. The width of the tape in use for the existing tape recorder is 6.25 mm. for either four tracks or eight tracks. In this usual kind of tape, as is the case with a four track one, four sound recording bands of about 1.0 mm. width are arranged in parallel at definite intervals with some margins on both sides. Consequently, the space between the center line of the first sound recording band and the second one is generally 1.7 mm. In the eight track kind, eight sound recording bands of about 0.6 mm. in width are arranged in parallel with an interval of 0.2 mm. of less and the space between the center line of the first sound recording band and that of the second one being 0.8 mm. or less. Consequently, it is obvious then that by a single switch-over cam, the switch-over of the two head positions altogether is difficult in these kinds of tapes.

In other words, speaking only of the number of tracks, it seems capable of performing a switch-over by the use of an eight-track cam only by doubling the cam driving speed provided in case of four tracks. Actually, this was once proposed, but in reality, it was found to have the above-mentioned difficulty. This is because, for one track, supposing the deviation of only 1 mm., is effective, but for the other track (two tracks forming one channel), the deviation will become around 5 mm. and about half the quantity of sound recording band will be deviated from the head echo so that a desirable sound recording and reproducing cannot be obtained.

In this present invention, the cam itself consists of two parts and each part constitutes a switch-over cam surface exclusively used for each of four tracks or eight tracks. This kind of cam consisting of two parts is conveniently switched-over at the time of insertion of the cartridge and activated on the recording head. Thus, each of the cam parts performs the switch-over of the head position adapted to the center line of the sound recording band. Therefore, effective and appropriate sound recording and reproducing is thus obtainable in connection with any kind of tape.

Many other features and effect and merit of this present invention will be clearly understood by referring to the description of the following embodiments. In the accompanying drawings.

Figure 1:
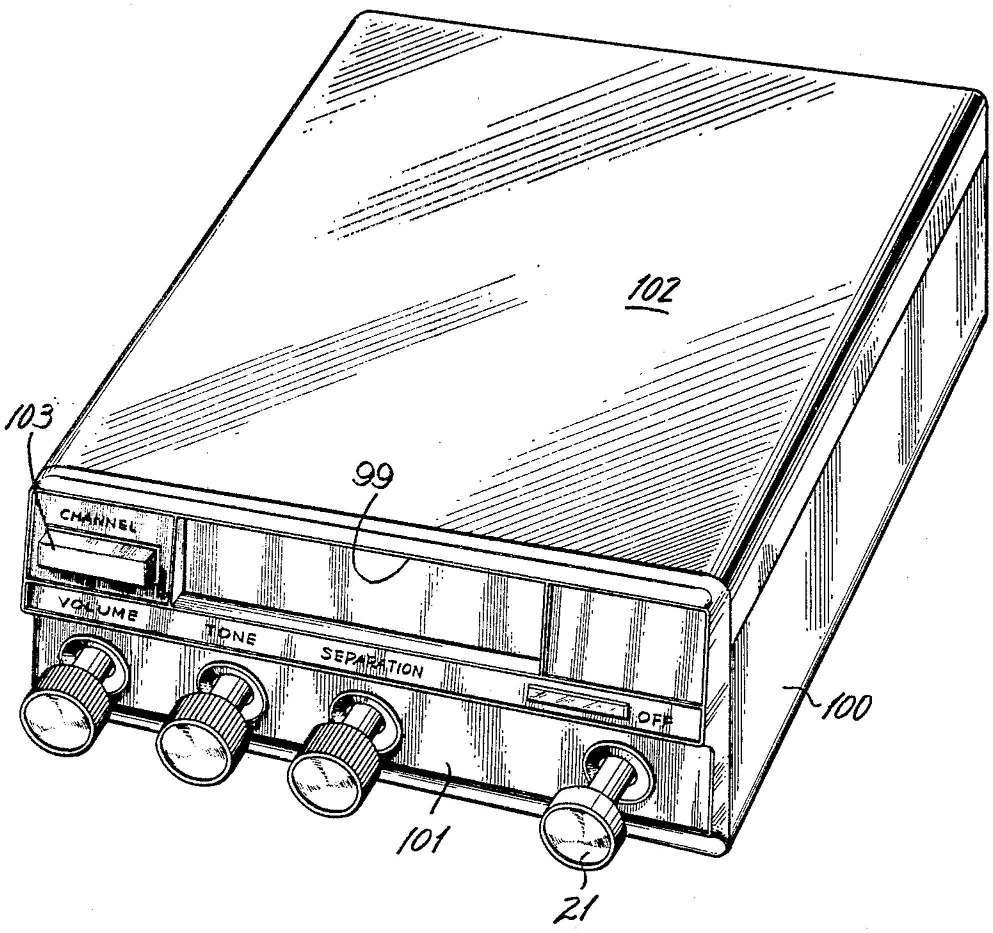
FIG. 1 shows a perspective view of the tape recorder of this present invention as viewed from the front thereof.

Referring now more particularly to the accompanying drawing, there is shown case 100 having a front plate 101 to which is attached a base plate 1 underneath cover-plate 102. On said base plate 1, guides 2 and 2' are mounted opposite one another and between these two guides 2 and 2', cartridge 30 for four-track use or cartridge 30' for eight-track can be inserted through opening 99 in front plate 101. At the front end of the inserted cartridge 30 or 30' there are positioned capstan 3 and regulator 29, mounted at the desired height and a reproducer head 5 attached to seat 28 with the latter being connected to said regulator 29 and a pinch-roller 4 is rigidly connected by rod **4*a* to a rotatory shaft 9 on the opposite side of capstan 3**.

This rotatory shaft 9 which is appropriate to pinch-roller 4, has one end supported by shaft bearing seat 31 fixed to lower bed plate 1' parallel with base plate underneath said upper base plate 1 and the other end of shaft 9 is rotatably supported by wall **1'*a* forming one side of said lower bed plate 1'. An end of rotary shaft 9 protrudes from side wall 1'*a* and has fixed thereto one end of crank plate 15 between shaft 16 of roller 16*a* mounted on the other end of said crank-plate 15 and hook 17 attached to said wall 1'*a*. A spring 18 is connected to and extends between shaft 16 and hook 17**.

Figure 2:
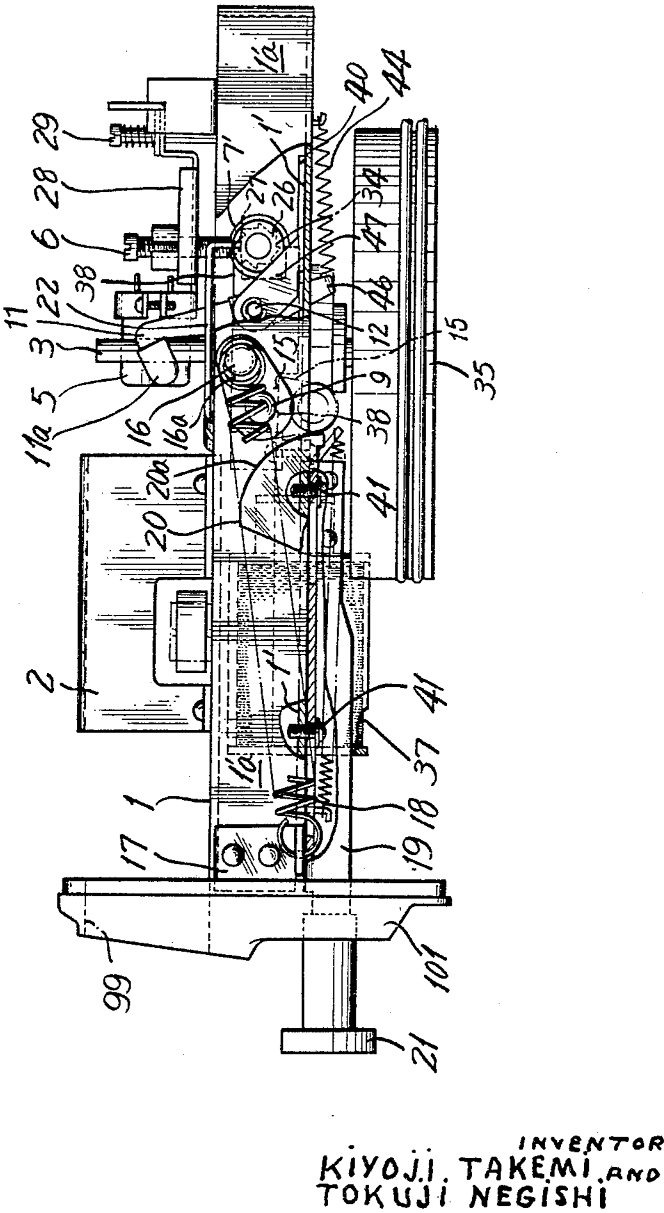
FIG. 2 is a side view of the same tape recorder with its case removed.

For engaging said roller **16*a* which can rotate freely, there is provided a cam member 20 slideably attached to bed plate 1' by screws 41 and the curved end of said cam member 20 forms cam 20*a*. As shown in FIG. 2, roller 16*a* is pushed downward from the dead point of said spring 18 by means of cam 20*a* and crank plate 15 is pushed upward beyond the dead point of said spring 18**.

At the inserted position of cartridge 30 or 30' as shown in the drawings, lever 11 of the pivot member 11' is engaged by the cartridge 30. Said pivot member 11' is pivotably mounted on shaft 12 supported by seat 40. Furthermore, said shaft 12 separately pivotably supports push member 13 which has a lateral arm 14 for acting on the shaft **4*a* of pinch-roller 4. Pivot member 11', push member 13 and tumbling member 32 are respectively pivotably connected by shaft 12 extending though holes 11h, 13*h* and 32*h*. The stop 33 extends into the path of pivot member 11' and push member 13 and by the action of a spring 10 on said shaft, push member 13 and tumbler 32 are pushed onto one side of pivot member 11' to assure a suitable stop position of stop 33. This pivot member 11', tumbler 32 and push member 13** constitutes one of the important points of this present invention.

Figure 7:
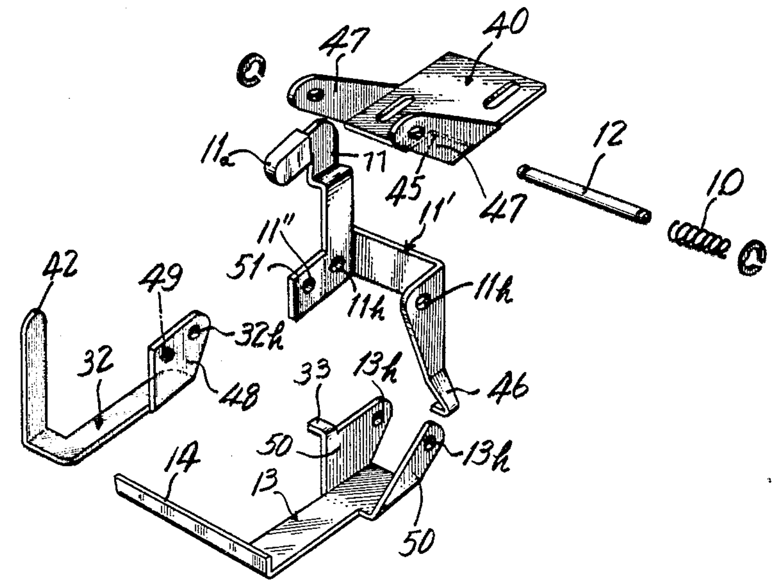
FIG. 7 shows a perspective exploded view of the support-seat and pivot member to be combined with the said support seat, operating metal piece, tumbling piece, pivot and spring.
Figure 8:
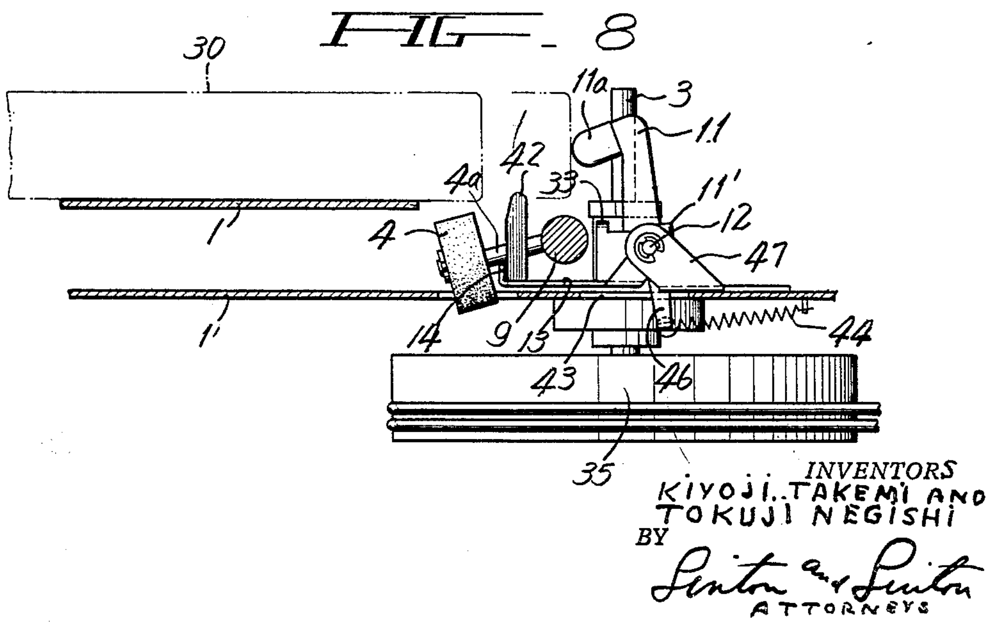
FIG. 8 is a side view of the members shown in FIG. 7 as assembled and in their position of operation immediately before the insertion of the cartridge.

In FIG. 7, a more detailed exploded showing is given of the parts as follows: In between support arm 47 and 48 of seat 40 pivot member 11' which is pivotably mounted, the two sides of this pivot member are bent and one side is extended upward to form the above-mentioned lever 11 which has cap **11*a* of synthetic resin material thereon and when this is engaged by cartridge 30 or 30', it does not damage the cartridge. The other side 46 of pivot members 11' is extended downward and goes down through a hole in bed plate 1' where spring 44 is attached to said side 46 and bed plate 1'. Consequently, the said lever 11 is pushed obliquely toward the direction of the opening 99 so as to insure the engagement of arm 45 of support seat 40 with arm 46. For this pivot member 11', tumbler 32 which is positioned inside lifting lever 11, has a bent portion which forms the contact 42. The other side of tumbler 32 has a portion folded upward forming terminal part 48**.

In this terminal part 48 there is formed an engaging protruded post 49 provided with an oblique or arcuate surface. This protruded post 49 engages with engaging hole 11'' of pivot member 11' and disengages therefrom. One end of push member 13 is folded upward on both sides forming pivot bearing flanges 50, 50, with said shaft holes **13*h*, therethrough, and the other end is bent to one side and folded upward thus forming lateral arm 14. One side of the said pivot bearing flanges 50, 50 forms engagement stop 33 protruded upward and sideways. The upper angular side of said terminal part 48 is formed into the shape of an arc, the center of which engages with protruded post 49, and hence it does not come into contact with stop 33. Consequently, stop 33 is stopped in shoulder 51**.

Said rotatory shaft 9 is equipped with radial pin 25. This pin 25 is inserted into an oblique-oblong hole 24 formed in curved part 22' of flat arm 22 which is suitably curved in its middle part in registry with said rotatory shaft 9. One end of this flat arm 22 is rotatably fitted to said bed plate 1 by means of pivot 23. The pointed end of arm 22 forms a fork end 27. This fork end engages a ratchet wheel 26, an end of which is attached to cam shaft 8, installed lengthwise of and slidingly mounted in the seat plate 28, mounted on said head 5. This shaft 8 is fitted with a cam 7 for four track use and another cam 7' for eight track use, and said cams are fixed adjacently in the lower position of the supporter 6 mounted on one side of said seat plate 28. It goes without saying that these cams 7 and 7' can be separately formed or can be made into one body.

Moreover, sliding member 19 is fitted with a push-button 21 enabling an easy cperation of its push motion. Besides, the said cam shaft 8 is equipped with a ratchet wheel 34. By moving the orientation operation piece, the said ratchet wheel 34, said cam shaft 8 and cams 7 and 7' will rotate. A plunger 37 is fitted on the bottom of the bed plate 1'. Against this plunger 37, a front plate 101 is pushed by means of push button 103 or is instantaneously electrically enregized and the control piece 38 will retreat, which can be tested by means of a dielectric leaf applied to the channel end of the tape. This control piece 38 is fitted with a suitable spring and can be released from the ratchet wheel 34 and the pointed end of control piece 38 is inclined at a suitable angle. By this position of the inclined control piece 38, the electric current of the plunger 37 is cut off by the elastic action of the spring and this comes into gear with the next tooth of the ratchet wheel 34 and rotates, thereby the inclined control piece 38 gets back to its original position in parallel with the plunger's axis 37.

Figure 5:
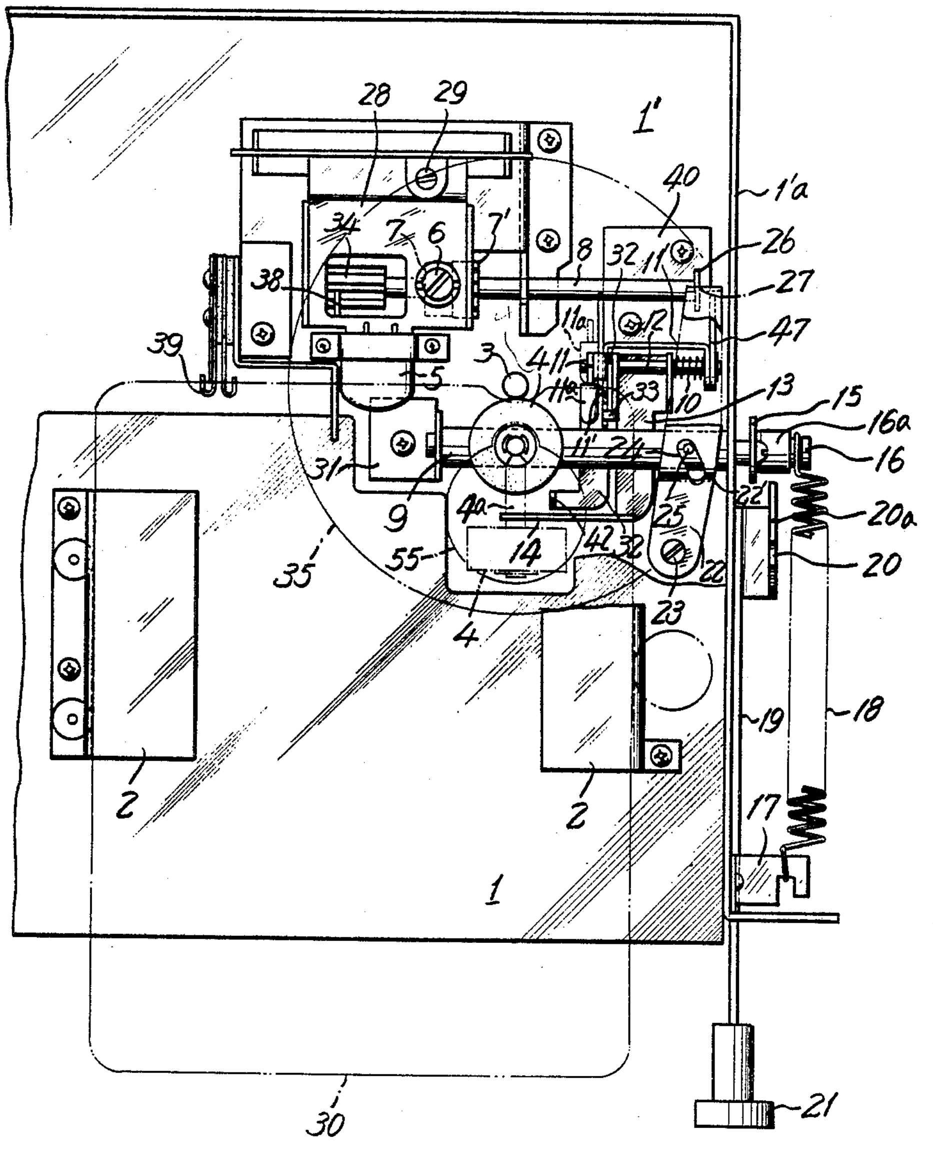
FIG. 5 is a plan view of the tape recorder of the present invention, showing the cartridge in broken lines without the pinch-roller at the time of its insertion.
Figure 9:
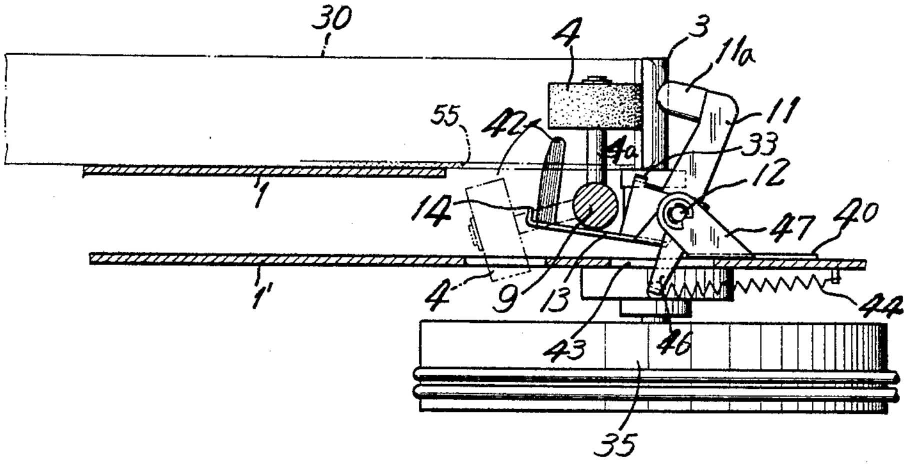
FIG. 9 is a side view of a cartridge without the pinch-roller inserted into the assembly shown in FIG. 8.

The operation of the above mentioned apparatus of this design is as follows. The base end of cartridge 30 for four track use containing no pinch-roller is inserted as shown in FIG. 5, the push-up part 11 of pivot member 11' is pushed forward and moved to a position as shown in FIG. 5. Consequently, pivot member 11' rotates around pivot shaft 12 and engages with gear stopper 33 and lifts operation member 13. By lifting operation member 13, tumbler 32 is lifted likewise as shown in FIG. 9. Thus by, this lifting action of operation member 13, the pointed end of lifting part 10 pushes rod 4' of pinch-roller 4, and thereby rotates rotatory shaft 9 and presses on the capstan 3 so as to lift pinch-roller 4. As described above, when rod 4' of driving shaft 9 is pushed up a little, rotatory shaft 9 rotates a little against the tension of spring 18 through the medium of crank-plate 15. Afterwards, it remains stationary until when the pinch-roller 4 comes to press against capstan 3 by the elasticity of spring 18. Thereby, the sound recording tape which is wound inside the cartridge 30 will be pinched between capstan 3 and the raised pinch-roller 4 and when capstan 3 turns around by means of a pulley driven by rotatory movement of a motor, this tape is driven forward with a definite speed. During this rotatory movement of the rotation shaft 9, pin 25 inside the oblique-oblong hole 24 of arm 22 moves from one direction to another, so that arm 22, one end of which is supported by pivot 23 and cam shaft 8, moves to the right and left through the medium of plate 26 in between the fork end part 27 and as shown in the figures, cam 7 for a four track use comes downward to the supporter's side and a suitable position for a four track system is determined.

To remove the cartridge 30 from this condition, just press on push-up button 21 of sliding piece 19 and this will result. By pushing the push-up button, member 20 has its pointed end on roller **16*a* so that the rotatory shaft 8 rotates in the reverse direction of that performed by the cartridge at the time of its insertion. At this moment, supporter 6 is mounted on cam 7' by the action of pin 25 of the said oblique-oblong hole 24**.

Figure 4:
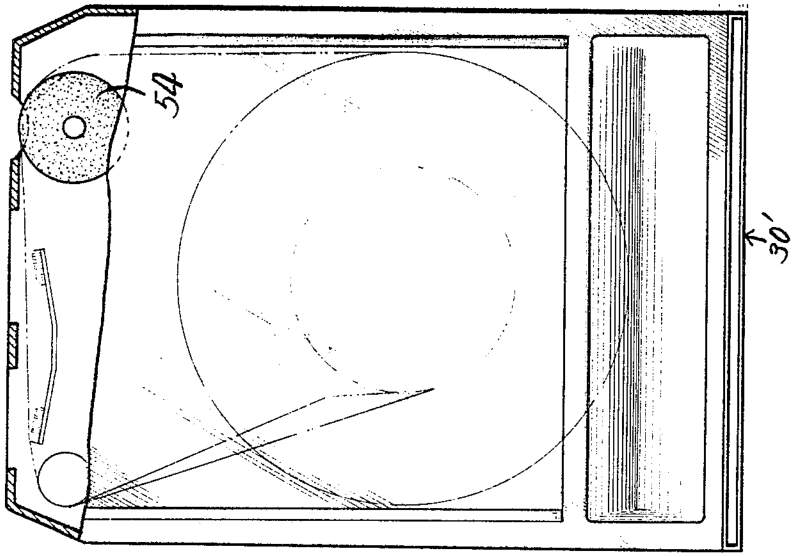
FIG. 4 is a plan view, partly broken away, of a cartridge without a pinch-roller at the time of its insertion together with a plan of a tape recorder, part of which being cut off.
Figure 3:
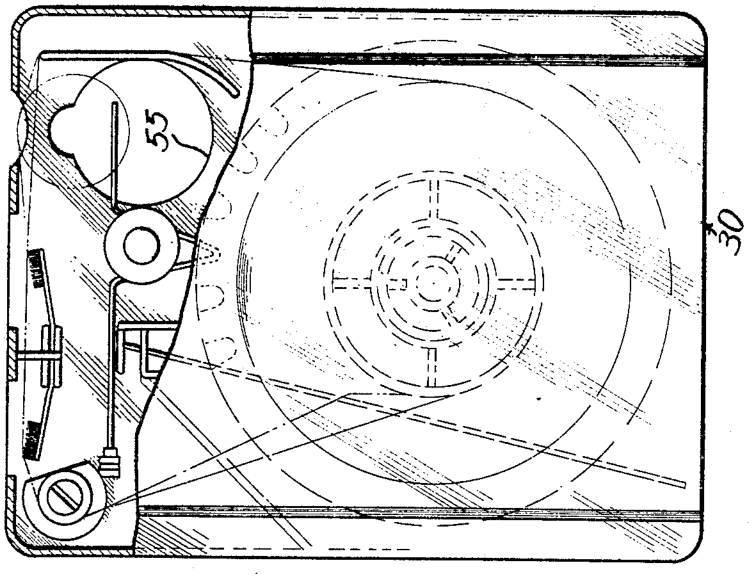
FIG. 3 is a plan view, partly broken away, of a cartridge without a pinch-roller.
Figure 6:
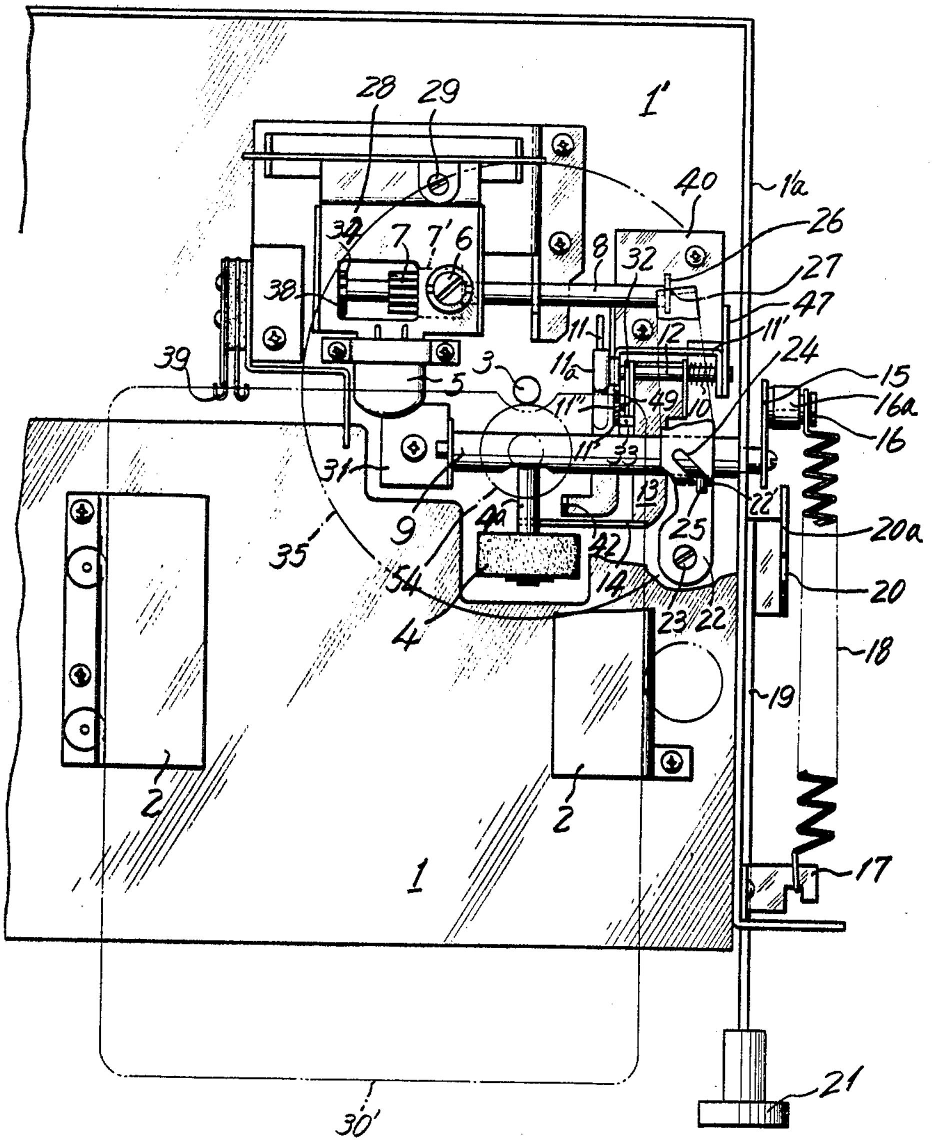
FIG. 6 is a plan view of a cartridge containing a pinch-roller at the time of its insertion.
Figure 10:
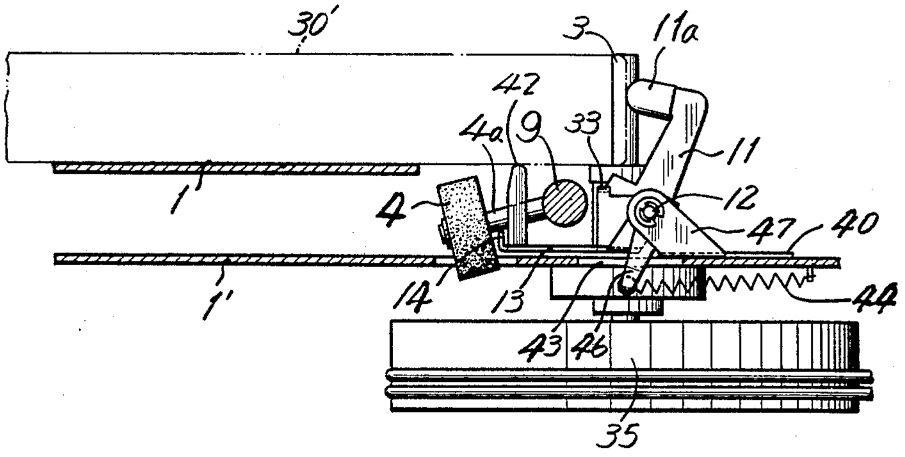
FIG. 10 is a side view of the assembly shown in FIG. 8 with a cartridge containing a pinch-roller inserted therein.
Figure 11:
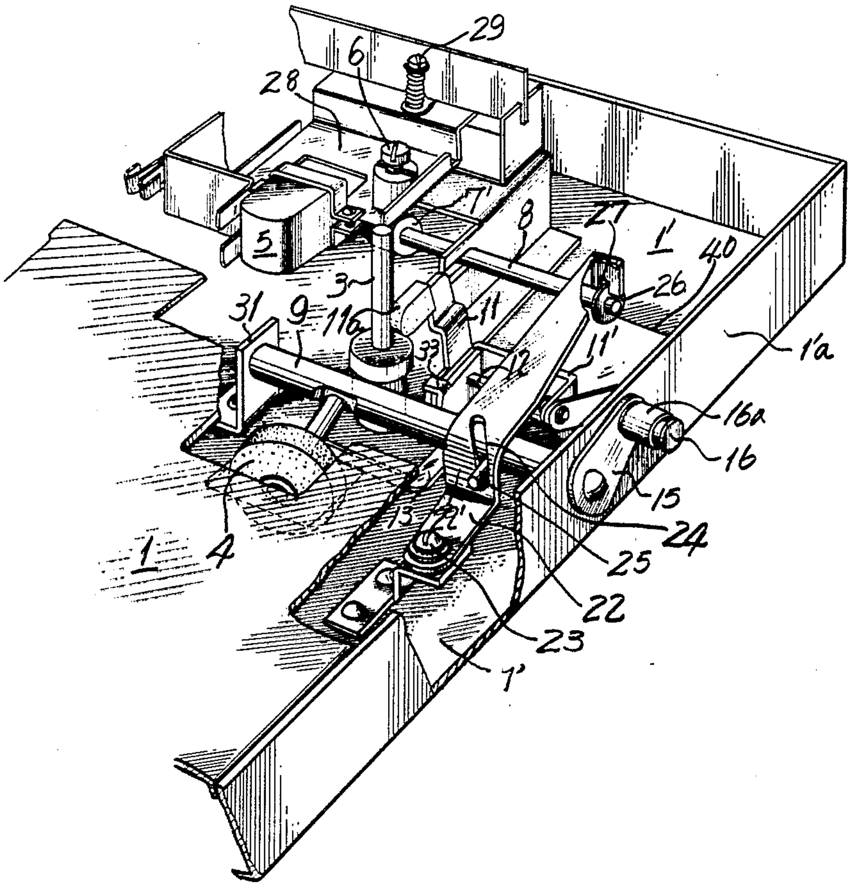
FIG. 11 shows a perspective view of the working piece and cam-shaft for the switching cam end stop plate of the cam shaft end portion.

The next position shows an apparatus containing the pinch-roller 4 in this condition. As shown in FIG. 4, when cartridge 30' for eight-track use is inserted in the apparatus, the latter changes to a state as shown in FIGS. 6 and 10. In other words, in the case when cartridge 30 for four-track use is to be inserted, the insertion hole 55 is provided in order for the insertion therein of the pinch-roller 4 in the bottom of the said cartridge and inside this insertion hole is lodged contact part 42 of tumbler piece 32 as shown in FIG. 5 so that the rotatory movement of tumbler piece 32 and pivot shaft 12 of operation member 13 can be performed without any trouble. Thereby, the lifting movement of pinch-roller 4 is carried out as explained above.

However, with the cartridge 30' for eight-track use, the pinch-roller 54 is mounted inside the cartridge 30', therefore the tumbling operation of the pinch-roller 54 is not necessary and cartridge 30' is not equipped with insertion hole 55 at the bottom. When this kind of cartridge 30' is inserted, by pushing part 11 of pivot member 11', operation member 13 of tumbler 32 tends to raise but since the pointed end of cartridge 30' acts on pivot member 11', the said cartridge 30' already going forward on to contact part 42 of tumbler piece 32, the lifting motion of tumbler 32 is arrested by contact part 12 in touch with the bottom of cartridge 30'. Therefore the operation of engaging stopper 33 and that of operation member 3 can be completely stopped and by the insertion of cartridge 30', pivot member 11' will rotate. As stated above, tumbler piece 32 and pivot member 11' are locked together by means of engaging hole 11'' and spherical protrusion 32' but when tumbler piece 32 stops rotating, pivot member 11 pushes sideways tumbler piece 32 and operation member 13 against the elastic action of spring 10, thereby the disengagement of finger 49 into the said engaging hole 11'' can be performed together with disengagement of the operation member with knock piece 11'. When there is no longer engagement between operation member 13 and pivot member 11', there is no further existence of the resistance between them, so that insertion of the cartridge 30' can be smoothly performed.

At this moment, when the above mentioned contact part 42 comes in touch with the cartridge bottom, the former having only contact with the latter, a smooth forwarding of cartridge 30' can be accomplished without any trouble and a part of pinch-roller 54 is correctly pressed against capstan 3. It is evident in this case, that rotatory shaft 9 does not rotate since there is no need of raising the pinch-roller inside the tape recorder so that cam 8 does not move and supporter 6 stays in the state of being mounted on cam 7' and the position of head 5 as determined by cam 7' for eight track use and supporter 6 coincides with the sound recording position of cartridge **30'*s* tape for eight-track use. Moreover, in the above mentioned case, supporter 6 is lodged on cam 7' for eight track use and by equipping with cartridge 30 for four track use, this supporter 6 comes in contact with cam 7, but when the inclination of the said oblique-oblong hole 24** is inverted, this is set in a reverse relation.

I claim:

1. In a tape recorder adapted for use with either a four-track tape or eight-track tape, a bed plate, a first tape cartridge having a bottom opening, a pinch roller, a second tape cartridge having a pinch roller, a recording head, guide members mounted to receive one of said tape cartridges at a time, a pivot member engageable with said first pinch roller, a first rotatable shaft mounted on said bed plate, resilient means connected to said first shaft tending to hold said first pinch roller below said cartridge, said first pinch roller being connected to said first rotatable shaft, said cartridges having external identifying concaves, said pivot member being engageable with said identifying concaves for raising said first pinch roller into said first cartridge bottom opening when said first cartridge is inserted, a second rotatable shaft having a pair of cams mounted thereon, said cams being adapted to selectively raise or lower said recording head according to the cartridge inserted, ratchet means mounted on said second shaft for rotating said second shaft step-by-step, displacing means connected to said recording head and actuable by said cams, a flat arm pivotally mounted on said bed plate, said flat arm having a recessed portion fitting over said first rotating shaft and said recessed portion having an oblique oblong slot, a pin on said first rotating shaft engageable in said slot whereby the position of said recording head is selectively displaced.

2. In a tape recorder as claimed in claim 1 including a third shaft having said pivot member pivotally mounted thereon, a push member pivotally mounted on said third shaft and positioned for engaging and raising said first pinch roller, said pivot member having a shoulder, said push member having a stop for being engaged and raised by said shoulder or slid therefrom upon resistance to the raising of said first pinch roller.

3. In a tape recorder as claimed in claim 2 including a contact member pivotally mounted on said third shaft and positioned for engaging the bottom of the inserted cartridge or entering said first cartridge bottom opening and means detachably engaging said contact member with said pivot member for pivoting the same together when said first cartridge is used or separating the same when said second cartridge is inserted.

References Cited

UNITED STATES PATENTS 3,388,911 6/1968 Wilson et al. ______ 179—100.2

BERNARD KONICK, Primary Examiner

JEROME P. MULLINS, Assistant Examiner

U.S. Cl. X.R.

179—100.2